United States Patent [19]

Tanaka et al.

[11] 4,130,603

[45] Dec. 19, 1978

[54] THERMOPLASTIC LINEAR BLOCK COPOLYETHER-POLYESTERS AS HOT MELT ADHESIVES FOR TEXTILES

[75] Inventors: Chiaki Tanaka, Chita; Yatabe Yoko; Morikawa Masanobu, both of Nagoya, all of Japan

[73] Assignee: Toray Industries, Inc., Tokyo, Japan

[21] Appl. No.: 765,608

[22] Filed: Feb. 4, 1977

[51] Int. Cl.² .............................................. C08L 67/02
[52] U.S. Cl. .................................. 260/860; 428/195; 260/22 R; 528/301; 528/302
[58] Field of Search ............................ 260/860, 75 R

[56] References Cited

U.S. PATENT DOCUMENTS

| | | | |
|---|---|---|---|
| 3,651,014 | 3/1972 | Witsiepe | 260/75 R |
| 3,784,520 | 1/1974 | Hoeschele | 260/860 X |
| 3,917,743 | 11/1975 | Schroeder | 260/860 |
| 3,932,326 | 1/1976 | Hoh et al. | 260/860 X |
| 3,959,062 | 5/1976 | Hoh et al. | 260/860 X |

*Primary Examiner*—Lucille M. Phynes
*Attorney, Agent, or Firm*—Miller & Prestia

[57] ABSTRACT

A hot melt adhesive for textiles which comprises a thermoplastic linear block copolyether-polyester consisting essentially of a dicarboxylic acid unit derived from 40 to 60 mol % of terephthalic acid and 60 to 40 mol % of isophthalic acid, glycol unit derived from 1,4-butanediol and a polyether unit derived from polytetramethylene glycol having a molecular weight of about 600 to 1,300, wherein the amount of the polyether unit is 10 to 33 % by weight on the basis of the block copolyether-polyester and the block copolyether-polyester has a relative viscosity of 1.3 to 1.7 and a melting point of 95° to 145° C. The hot melt adhesive affords a large adhesive bond strength without spoiling the softness and liveliness of the textiles.

2 Claims, No Drawings

THERMOPLASTIC LINEAR BLOCK COPOLYETHER-POLYESTERS AS HOT MELT ADHESIVES FOR TEXTILES

BACKGROUND OF THE INVENTION (1) Field of the Invention

The present invention relates to a hot melt adhesive for textiles. More particularly the present invention relates to a hot melt adhesive for textiles comprising a thermoplastic linear block copolyether-polyester having a specific composition. The block copolyether-polyester adhesive for textiles affords a strong adhesive joint with greatly improved properties.

(2) Description of the Prior Art

Hot melt adhesives have been well known in the art. For example, certain kinds of polyethylene, polyethylene-vinylacetate, polyvinyl chloride and polyamide are conveniently applied to textiles in a molten state so as to form an adhesive bond upon cooling. Among these known adhesives, polyolefin and polyvinyl chloride have a poor bonding strength to textiles, especially to textiles composed of polyester fibers. They easily lose their adhesive strength at elevated temperatures. Polyamides, which are the most practical hot melt adhesive for textiles at present, exhibit good adhesive strength and good resistance to dry cleaning agents, but the properties of the textiles bonded therewith are not necessarily excellent and furthermore their adhesive strength is often lost after washing with a detergent and hot water or after steaming.

It has already been proposed in Japanese patent publication (Kokai) 73-96876 that a block copolyether-polyester can be utilized as a hot melt adhesive for textiles because of its elastic properties and strong bonding strength. However, the block copolyether-polyester disclosed therein does not necessarily have a high resistance to dry-cleaning or hot-water washing. Thus, an object of the present invention is to provide a hot melt adhesive for textiles having improved adhesive properties, especially with respect to their resistance to dry cleaning agents and hot water washing in addition to softness and liveliness the textiles bonded thereby.

SUMMARY OF THE INVENTION

We have now found a thermoplastic linear copolyether-polyester, consisting essentially of a dicarboxylic acid unit derived from 40 to 60 mol % of terephthalic acid and 60 to 40 mol % of isophthalic acid, a glycol unit derived from 1,4-butylene glycol and a polyether unit derived from polytetramethylene glycol having a molecular weight of 600 to 1,300 wherein the polyether unit constitutes 10 to 33% by weight on the basis of the block copolyether-copolyester. The block copolyether-copolyester has a relative viscosity of 1.3 to 1.7 and melting point of 95 to 145° C., and is an excellent hot melt adhesive for textiles. The copolyether-polyester adhesive of the present invention affords an adhesive joint with a greatly improved property in respect to softness, liveliness and resistance to dry-cleaning and hot-water washing.

DESCRIPTION OF THE PREFERRED EMBODIMENTS

The composition of a thermoplastic linear block copolyetherpolyester having a relative viscosity of 1.3 to 1.7 and a melting point of 95° to 145° C., consists essentially of a polyester unit dervied from terephthalic acid, isophthalic acid and 1,4-butanediol, and a polyether unit derived from poly(tetramethylene oxide)-glycol having a molecular weight of about 600 to 1,300. The acid component of the polyester unit comprises from 40 to 60 mol % of terephthalic acid and 40 to 60 mol % of isophthalic acid. The poly(tetramethylene oxide)glycol unit constitutes 10 to 33% by weight of the copolyether-polyester. The hot melt adhesive of the present invention has an excellent bonding strength to textiles such as interlining, and keeps the bonded fabrics soft and lively.

Fabrics bonded with known hot melt adhesives of block copolyether-polyester usually recover their bonding strength after immersion in dry-cleaning chemicals followed by drying. However, the bonding strength is reduced by the chemicals and therefore delamination of the bonded fabric occurs easily when agitation is applied: in conjunction with chemical treatment.

While the hot melt adhesive of the present invention prevents the reduction of bonding strength by dry-cleaning chemicals, the bonded fabrics keep their form, properties and softness after dry-cleaning thereof. The reason why this composition prevents the reduction of bonding strength by dry-cleaning chemicals is unknown, but it may be due to the microstructure of the phase separation of the polyether-polyester block copolymer.

it is further surprising that the composition improves hot-water resistance and maintains softness and bonding strength after detergent hot-water washing of the bonded textiles, because it is well known that polyester to easily degrades upon hydrolysis.

According to this invention, the mole ratio of terephthalic acid and isophthalic acid in the polyether-polyester block copolymer is essential, because only this ratio of the dicarboxylic acids affords the composition proper softening temperature and flow properties. Incorporation of other dicarboxylic acid or diol components results in lower bonding strength and reduced resistance toward hot water and dry-cleaning agents. However, up to 20 mol % of each component may be replaced by other glycols and dicarboxylic acids.

Poly(tetramethylene oxide)glycol used in this invention should have a molecular weight of 600 to 1,300. Poly(tetramethylene oxide)glycols with lower or higher molecular weight are not recommended, because the resuting polymers have poor resistance to dry-cleaning chemicals and to hydrolysis.

The amount of poly(tetramethylene oxide)glycol units incorporated in the block copolyether-polyester is of great significance and in this invention. The amount must be 10 to 33 weight % of the copolyether-polyester, preferably 12 to 23 weight %. When the amount of poly(tetramethylene oxide) glycol unit is less than about 10%, the copolyether-polyester has reduced resistance to hydrolysis and no longer exhibits elastic properties. When the amount of poly(tetramethylene oxide)-glycol units is more than 33%, the resulting polymers are no longer resistant to dry-cleaning chemicals. The microstructure of phase-separation between the polyester and the polyether components is very important in this invention, and the structure is controlled by the molecular weight and the amount of poly(tetramethylene oxide)glycol units.

The polyether-polyester must have a relative viscosity of 1.3 to 1.7 as measured by the standard method using 0.5 g of polymer per 100 ml of orthochlorophenol at 25° C. A block copolyether-polyester having a lower relative viscosity is brittle and does not possess strong bonding strength. A polymer having a higher relative viscosity exhibits bad flow and wetting properties when applied as hot melt adhesives.

The block copolyether-polyester described herein can be conveniently prepared by a conventional ester-interchange reaction. A preferred example involves heating the dimethylesters of terephthalic acid and isophthanic acid with poly(tetramethylene oxide)-glycol and an excess of 1,4-butanediol in the presence of the usual ester-interchanging catalyst at 150°–250° C., while distilling off methanol formed in the reaction. The resulting prepolymer is then carried to the desired molecular weight polymer by the distillation of excess of the butanediol under 3 mmHg and at 240°–250° C. The prepolymer can also be prepared by the direct esterification of the dicarboxylic acids with diols in the presence of a catalyst. The polyetherester can be made by the melt blending of a polyester and poly(tetramethylene oxide)glycol and heating in the presence of an ester interchanging catalyst.

The amount of poly(tetramethylene oxide)glycol unit in the polymer may be adjusted by the melt blending of a polyester and a polyether-polyester containing a large amount of poly(tetramethylene oxide)glycol units. Although the copolyester of this invention posesses many desirable properties, it is recommended to add a stabilizer in the polymer composition during polymerization or after polymerization. The preferred stabilizers may be a hindered phenol, an aromatic amine, benzophenone derivatives or benzotriazole derivatives.

A well-known ester-interchanging or polycondensation catalyst can be used in this invention, but organic titanates such as tetrabutyl titanate or tetrabutylenediol titanate are preferably employed alone or in combination with a stannous compound.

The resultant polymer may be processed by substantially all procedures which have been used for hot-melt adhesives. The polymer may be used in the form of either a film, fiber or powder. In general the polymer offers a significant processing advantage over a polyolefin, a polyamide or a polyvinylchloride. The polymer can be readily extruded to form films or fibers, and the polymer can be readily calendered or extruded to produce coated woven or non-woven fabrics.

The polymer may also be crushed at a temperature of liquid nitrogen into a fine powder having an average diameter of 1 to 300μ, preferably 5 to 200μ.

The hot melt adhesive powder of the present invention is suitable for use in connection with the coating of interlinings and non-wovens with a powder point application using, for example, a dotting or scattering machine.

The coated fabrics are used for the front-fixing of women's and men's wear. The powder may preferably be applied in an amount of 5 to 50 g/m² on the interlinings.

The bonding of shell fabrics is carried out with electric or steam presses at a temperature of 135° to 155° C. in 10 to 20 seconds under a pressure of 100 to 300 g/cm².

A powder with particles of a size of 100–200 microns is used for "top-fusing" shirt collar interlinings. The shirt collar thus obtained has excellent resistance to washing and yellowing.

The powder with particles of a size of 150–300 microns are also suitable for the coating of interlinings and non-wovens using a sintered coating method.

The bonding of shell fabrics to the interlinings is carried out under similar conditions as above and the bonding results in good performance from the point of view of knife-fouling, strike-back and strike-through.

The hot melt adhesive powder of the present invention may also be used as a paste material to apply to textiles. Preferably, the powder contains a lubricant such as magnesium stearate calcium stearate, "aerosil" or talc.

The substrates of this invention are textiles, or an assembly of fibers including paper and leather.

They may be woven fabrics, non-woven fabrics, knitted fabrics, fibrous structures or bands of filaments, which are made of natural or synthetic fibers or mixtures thereof.

The block copolymer of this invention may be incorporated with various additives such as plasticizers, pigments, nucleating agents, and the like. The hot melt adhesive of this invention may contain up to 30% by weight of other thermoplastics such as a polyamide, a polyolefin, a polyvinylchloride, a polyepoxide, and so on.

The following examples are set forth in illustration of this invention and should not be construed as a limitation thereof.

In the Examples, the melting point of the polymer was measured by Rigaku Denki's Thermomechanical Analysis (TMA), and defined to be the temperature at which the pin penetrated into the polymer chip to a depth of 250μ; the pin had a diameter of 0.5 mm, the load applied to the pin was 5 g, the temperature was increased at a rate of 10° C. per min.

EXAMPLE 1

Into a glass flask having a stainless steel-stirrer with helical ribbon type screw, 78.6 parts of dimethyl terephthalate, 96.0 parts of dimethyl isophthalate, 120 parts of 1,4-butanediol and 41.7 parts of poly(tetramethylene oxide) glycol having a molecular weight of about 1000 were placed together with 0.08 parts of tetrabutyl titanate. The mixture was heated with stirring at 210° C. for 2 hours while distilling off methanol from the reaction system. The recovered methanol was 52.0 parts which corresponded to 90% of the theoretical weight. The reaction temperature was then raised to 250° C. and the pressure on the system was reduced to 0.2 mmHg for a period of 60 minutes. Polymerization was continued for 80 minutes under these conditions.

The relative viscosity of the product in orthochlorophenol at 25° C. was 1.43 and the polymer showed a melting point of 120° C.

The polymer resin was crushed into powder under a liquid nitrogen atmosphere and the resulting powder having a particle size of 60~180μ was applied onto some fabrics and steam-ironed at 150° C. under a pressure of 300g/cm² for 13 seconds. The peel strength was measured. The results were as follows:

| fabric | Applied amount g/m² | Peel Strength after ironing g/in |
|---|---|---|
| Cotton | 30 | 1750 |
| Cotton | 15 | 1100 |
| Polyester | 30 | inseparable |
| Polyester | 15 | 2200 |
| Wool | 30 | 1500 |
| Wool | 15 | 1250 |
| Polyester/Cotton | 30 | 2700 |

| fabric | Applied amount g/m² | Peel Strength after ironing g/in |
| --- | --- | --- |
| Polyester/Cotton | 15 | 1850 |

EXAMPLE 2

Substantially following the procedures described in Example 1, a block copolyetherester was prepared from the following materials.

| | | |
| --- | --- | --- |
| Dimethyl terephthalate | 87.3 | parts |
| Dimethyl isophthalate | 87.3 | " |
| 1,4-Butanediol | 130 | " |
| Poly(tetramethylene oxide)glycol, number average molecular weight 1000 | 54.7 | " |

This polymer contained 25 wt% of polyether soft segments. The resulting polymer was crushed into powder having a particle size of 100–300μ and homogeneously placed between two pieces of mixed spun fabrics of polyethylene terephthalate fiber and cotton at a rate of 20g/m². The resulting composite was hot pressed so as to bond the two fabrics at 145° C. under a pressure of 350g/cm² for 30 seconds, followed by testing of the peel strength. For comparison, five polymer samples were prepared in the same way as mentioned in Example 2 except that the proportions of the polyether soft segments were changed. These polymers were also applied to the above fabrics and that tested.

The bonded cloth was soft and flexible and the softness thereof was maintained after immersion in hot water or perchloroethylene.

As a comparison, the following powder samples were applied to the dot-coating machine and tested as above. The test results for these polymers are tabulated below.

Control sample:
(1) Copolyamide
  Nylon 6/66/12 (35/25/40 weight percent)
(2) Copolyetherester
  hard segment: polybutylene terephthalate (containing no isophthalate component)
  soft segment: poly(tetramethylene oxide)glycol having a molecular weight of 1000, 80 wt% of content in copolymer
(3) Copolyetherester
  hard segment: polybutylene terephthalate/isophthalate copolyester (70/30 weight percent)
  soft segment: poly(tetramethylene oxide)glycol having a molecular weight of 1000 60 wt% of content in copolymer
(4) Copolyetherester
  hard segment: polybutylene terephthalate/isophthalate copolyester (65/35 weight percent)
  soft segment: poly(tetramethylene oxide)glycol having a molecular weight of 1000, 16 wt% of content in copolymer
(5) Copolyester
  polyethylene terephthalate/sebacate copolyester (55/45 weight percent)

Table 1

| | | | | Peel Strength(g/in) | | |
| --- | --- | --- | --- | --- | --- | --- |
| | Run | Polyether soft segment (Wt %) | Tm (° C) | Initial | After Dry Cleaning (JIS L1089) | After Wet Cleaning at 90° C (JIS) L1089) |
| This Invention | 1 | 25 | 124 | 1250 | 1180 | 1190 |
| | 2 | 30 | 121 | 1180 | 950 | 1210 |
| | 3 | 20 | 127 | 1230 | 1200 | 1190 |
| | 4 | 10 | 131 | 1420 | 1380 | 990 |
| Comparative Example | 5 | 50 | 108 | 890 | 270* | 960 |
| | 6 | 0 | 134 | 1170 | 1100 | 520* |

*partially peeled off

EXAMPLE 3

The copolyester powders prepared in Example 2 within the range from 63μ to 177μ, namely, from 80 mesh to 250 mesh were sufficiently mixed with 0.2 weight percent of magnesium stearate in a Henschel type mixer. Thereafter, the resulting powders were dotted on a cotton under-cloth at a rate of 18g/m² by using a Saladin dotting machine. The cotton under-cloth was overlapped on a thin outer cloth made from wool, and the resulting composite was hot-pressed at 150° C. for 10 seconds to prepare a bonded cloth. The peel strength was measured. The results were as follows:

| | | |
| --- | --- | --- |
| Peel strength of the bonded cloth | 1300 | g/inch |
| Peel strength after washing in 90° C hot water for 30 minutes by using a wash-cylinder | 1250 | " |
| Peel strength after dry-cleaning in perchloroethylene for 30 minutes by using a wash-cylinder | 1230 | " |

| | | | Peel Strength (g/inch)[2] | | | |
| --- | --- | --- | --- | --- | --- | --- |
| | Tm (° C) | MI[1] (g/10 min) | initial | After Wet Cleaning | After Dry Cleaning | Softness |
| Example 3 | 124 | 80 | 1300 | 1250 | 1230 | Excellent |
| Control 1 | 117 | 83 | 1360 | 420* | 1270 | Poor |
| Control 2 | 135 | 78 | 680 | 450* | peeled off | Excellent |
| Control 3 | 126 | 77 | 1100 | 720 | 360* | Good |
| Control 4 | 156 | 75 | 80 | peeled off | peeled off | — |
| Control 5 | 130 | 80 | 970 | 540* | 370* | Good |

[1] at 190° C, 2160g load [2] bonding and testing conditions were the same as mentioned above
*partially peeled off

EXAMPLE 4

This example illustrates the relation between performance and the molecular weight of the poly(tetramethylene oxide)glycol in the block copolyetheresters. Resins were prepared in the same way as mentioned in Example 2 except that the molecular weight of poly(tetramethylene oxide)glycol was changed as indicated in the following table.
Polymer composition hard segment polybutylene terephthalate/isophthalate (50/50 weight percent)

soft segment poly(tetramethylene oxide)glycol 25 weight % of copolymer

Powdering crushed under liquid nitrogen atmosphere

Yield was illustrated with the yield of applicable powder of 1~300μ particle

Application of the powder of 60~180 microns by means of a Saladin dotting machine onto a cotton under-cloth preheated by a hot roller at 200° C. Applied polymer amount was 25g/m² in each cases. The polymer powder dots containing a high molecular weight of PTMG were not strongly bonded onto the cotton under-cloth.

Hot press

Bonding with polyethylene terephthalate fabrics at 150° C. under a pressure of 300g/cm² for 15 seconds.

Table 2

| Run | Molecular Weight of PTMG | Processability | | Peel Strength (g/inch) | | |
|---|---|---|---|---|---|---|
| | | Powdering (yield of applicable size of powder) | Dotting application | initial | After Wet Cleaning (JIS L1089) | After Dry Cleaning (JIS L1089) |
| 1 | 400 | Good (95%) | Good | 1550 | 1250 | 470* |
| 2 | 800 | Good (96%) | Good | 1870 | 1400 | 1590 |
| 3 | 1250 | Good (95%) | Good | 1620 | 1510 | 1500 |
| 4 | 2000 | Poor (65%) | Poor | 840 | 670 | 210* |

*partially peeled off

What we claim is:

1. A dry cleaning resistant hot-melt adhesive for textiles which comprises a thermoplastic linear block copolyether-polyester consisting essentially of a dicarboxylic acid unit derived from 40 to 60 mol % of terephthalic acid and 60 to 40 mol % of isophthalic acid, a diol unit derived from 1,4-butanediol and a polyether unit derived from poly tetramethylene glycol having a molecular weight of about 600 to 1300, wherein the amount of the polyether unit is 10 to 33% by weight on the basis of the block copolyether-polyester and the block copolyether-polyester has a relative viscosity of 1.3 to 1.7 as measured using 0.5 g. of polymer per 100 ml. of orthochlorophenol at 25° C. and a melting point of 95° to 145° C.

2. Pulverized dry cleaning resistant hot-melt adhesive for textiles which comprises fine particles of a thermoplastic linear copolyether-polyester having a diameter of 1μ to 300μ, wherein the copolyether-polyester consists essentially of a dicarboxylic acid unit derived from 40 to 60 mol % of terephthalic acid and 60 to 40 mol % of isophthalic acid, a diol unit derived from 1,4-butanediol and a polyether unit derived from poly tetramethylene glycol having a molecular weight of about 600 to 1300, wherein the amount of the polyether unit is 10 to 33% by weight on the basis of the block copolyether-polyester and the block copolyether-polyester has a relative viscosity of 1.3 to 1.7 as measured using 0.5 g. of polymer per 100 ml. of orthochlorophenol at 25° C. and a melting point of 95° to 145° C.

* * * * *